US010761050B2

(12) United States Patent
Yamada et al.

(10) Patent No.: US 10,761,050 B2
(45) Date of Patent: Sep. 1, 2020

(54) MOLECULAR DETECTION APPARATUS AND MOLECULAR DETECTION METHOD

(71) Applicant: KABUSHIKI KAISHA TOSHIBA, Minato-ku (JP)

(72) Inventors: Ko Yamada, Yokohama (JP); Hirohisa Miyamoto, Kamakura (JP); Norikazu Osada, Meguro (JP); Mitsuhiro Oki, Kawasaki (JP); Yasuko Noritomi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 45 days.

(21) Appl. No.: 15/685,117

(22) Filed: Aug. 24, 2017

(65) Prior Publication Data

US 2017/0350854 A1    Dec. 7, 2017

Related U.S. Application Data

(63) Continuation of application No. PCT/JP2015/004038, filed on Aug. 12, 2015.

(51) Int. Cl.
*G01N 27/00* (2006.01)
*G01N 27/414* (2006.01)
(Continued)

(52) U.S. Cl.
CPC ......... *G01N 27/4141* (2013.01); *G01N 27/62* (2013.01); *H01J 49/025* (2013.01); *G01N 27/622* (2013.01); *H01J 49/40* (2013.01)

(58) Field of Classification Search
CPC .............................................. G01N 27/4141
(Continued)

(56) References Cited

U.S. PATENT DOCUMENTS 6,043,633 A * 3/2000 Lev ..................... H02M 1/4225
                                                           323/222
2002/0036263 A1   3/2002 Shiokawa et al.
(Continued)

FOREIGN PATENT DOCUMENTS

CN         102318035 A      1/2012
EP         2 828 647 A2     1/2015
(Continued)

OTHER PUBLICATIONS

Toshihiro Fujii, Miyoshi Ogura, and Hitoshi Jimba "Chemical Ionization Mass Spectrometry with Lithium Ion Attachment to the Molecule" Anal. Chem. 1989, 61, 1026-1029 (Year: 1989).*

(Continued)

*Primary Examiner* — Christine T Mui
*Assistant Examiner* — Emily R. Berkeley
(74) *Attorney, Agent, or Firm* — Oblon, McClelland, Maier & Neustadt, L.L.P.

(57) ABSTRACT

A molecular detection apparatus according to an embodiment includes: a distributor which ionizes a target containing substances to be detected, applies voltage to ionized substances, and extracts the substances to be detected according to a time-of-flight based on the speed; a detector which detects the substance to be detected dropped from the distributor; and a discriminator which discriminates the substance to be detected. The detector includes: a plurality of detection units including field effect transistors using graphene layers; and a plurality of organic probes which are provided on the graphene layers, and at least some of which have different bond strengths with the substances to be detected. The substance to be detected is discriminated depending on a signal pattern based on intensity differences of the detection signals generated by differences in the bond (Continued)

strengths between the organic probes and the substances to be detected.

10 Claims, 11 Drawing Sheets

(51) Int. Cl.
*H01J 49/02* (2006.01)
*G01N 27/62* (2006.01)
*H01J 49/40* (2006.01)

(58) Field of Classification Search
USPC .......................................................... 436/104
See application file for complete search history.

(56) References Cited

U.S. PATENT DOCUMENTS

| | | |
|---|---|---|
| 2006/0040318 A1 | 2/2006 | Melker et al. |
| 2008/0116490 A1 | 5/2008 | Stewart et al. |
| 2009/0032701 A1 | 2/2009 | Rodier |
| 2009/0078862 A1 | 3/2009 | Rodier et al. |
| 2009/0272894 A1 | 11/2009 | Shiokawa et al. |
| 2012/0028820 A1 | 2/2012 | Rhodes et al. |
| 2012/0184041 A1 | 7/2012 | Carella et al. |
| 2012/0214172 A1 | 8/2012 | Chen et al. |
| 2013/0273665 A1 | 10/2013 | Swager et al. |
| 2014/0145735 A1* | 5/2014 | Koester ............... G01N 27/227 324/686 |
| 2015/0268208 A1 | 9/2015 | Rhodes et al. |
| 2016/0290955 A1 | 10/2016 | Zhong et al. |
| 2016/0379814 A1 | 12/2016 | Yamada et al. |

FOREIGN PATENT DOCUMENTS

| | | |
|---|---|---|
| EP | 2 848 929 A1 | 3/2015 |
| JP | 2003-513694 | 4/2003 |
| JP | 2005-127907 | 5/2005 |
| JP | 2008-216083 | 9/2008 |
| JP | 2009-270838 | 11/2009 |
| JP | 2010-19688 | 1/2010 |
| JP | 2010-25719 | 2/2010 |
| JP | 2010-38569 | 2/2010 |
| JP | 2010-38840 | 2/2010 |
| JP | 2010-139269 | 6/2010 |
| JP | 2010-535345 | 11/2010 |
| JP | 2011-80798 | 4/2011 |
| JP | 2012-247189 | 12/2012 |
| JP | 2013-505439 | 2/2013 |
| JP | 2013-253825 | 12/2013 |
| JP | 2015-515622 | 5/2015 |
| WO | WO 2009/018305 A1 | 2/2009 |
| WO | WO 2011/082178 A1 | 7/2011 |
| WO | WO 2013/184222 A2 | 12/2013 |
| WO | WO 2015/085074 A1 | 6/2015 |
| WO | WO 2015/136695 A1 | 9/2015 |

OTHER PUBLICATIONS

International Search Report dated Nov. 10, 2015 in PCT/JP2015/004038, filed on Aug. 12, 2015 (with English translation).

Written Opinion dated Nov. 10, 2015 in PCT/JP2015/004038, filed on Aug. 12, 2015.

Lingtao Kong, et al. "Novel pyrenehexafluoroisopropanol derivative-decorated single-walled carbon nanotubes for detection of nerve agents by strong hydrogen-bonding interaction", Analyst, 2010, 135, 10 pages.

Jia Huang, et al. "Monolayer-Dimensional 5,5'-Bis(4-hexylphenyl)-2,2'-bithiophene Transistors and Chemically Responsive Heterostructures", Advanced Materials, 2008, 20, 6 pages.

Gugang Chen, et al. "Sub-ppt gas detection with pristine graphene", Applied Physics Letters, 2012, 101, 5 pages.

Extended European Search Report dated Mar. 6, 2019 in Patent Application No. 15900951.3, 12 pages.

Anonymous, "Mass Spectrometry", Wikipedia, Retrieved from the Internet: URL:https://en.wikipedia.org/w/index.php? XP055561782, Aug. 6, 2015, pp. 1-22.

* cited by examiner

MOLECULAR DETECTION APPARATUS AND MOLECULAR DETECTION METHOD

CROSS-REFERENCE TO RELATED APPLICATIONS

This application is a continuation of prior International Application No. PCT/JP2015/004038 filed on Aug. 12, 2015; the entire contents of all of which are incorporated herein by reference.

FIELD

Embodiments described herein generally relate to a molecular detection apparatus and a molecular detection method.

BACKGROUND

A water heater or the like for household use is provided with an apparatus that detects carbon monoxide generated when incomplete combustion occurs and notifies the risk thereof at an early stage. Such a gas component considerably affects a human body. According to the guidelines from LP gas safety committee, it is set that a carbon monoxide concentration of approximately 200 ppm (parts per million) causes headaches. Although various methods have been known as a method of detecting a gas component having a relatively higher concentration, the detection methods have been limited for detecting the gas component having a concentration of ppb (parts per billion) to ppt (parts per trillion), which corresponds to an extremely low concentration.

At a disaster site or a site at which an act of terrorism occurs or the like, it has been desired to sense the risk in advance by detecting an extremely small amount of the gas component. The gas component having an extremely low concentration is often detected by use of large equipment in research facilities. In this case, a large sized installation type apparatus, which is expensive and has large weight and volume, such as a gas chromatography or mass spectrometer is required. The case when direct measurement is desired on the go relies on a simple measurement method that detects the gas component by use of a biological reaction mechanism, but has many problems of a storage life, temperature management, a limit of determination whether the gas component is present or not, and the like. Under such circumstances, an apparatus has been required that is capable of detecting the gas component having an extremely low concentration in real time, in other words, an apparatus that has a smaller weight and volume and a better portability and enables selective and higher sensitive detection of the gas component having an extremely low concentration in the order of ppt to ppb.

As a detection element for the gas component having a low concentration, for example, an element has been known that has a conductive layer in which a surface of a carbon nanostructure is surface modified with a substance that selectively reacts with or adsorbs a specific substance and measures a potential difference or the like that changes depending on the gas component that has adhered to the surface of the carbon nanostructure. In such a detection element, there is a possibility that it is impossible to accurately detect a detection target gas component when a component or the like similar to the detection target gas component is mixed in the gas obtained from, for example, the air as impurities. Besides, the detection substances are limited to alcohol, nitrogen oxide, and so on whose molecular structure is simple and lack in complexity. There is known a detection element including a field effect transistor using a graphene film and a functional group provided on the graphene film as an element which detects material species in a solution. This detection element uses a single chain, an antigen, an enzyme, and so on forming a double spiral structure of DNA, and it aims at identifying biological species such as DNA in the solution.

DETAILED DESCRIPTION

A molecular detection apparatus according to an embodiment includes: a distributor which includes: an ionization unit ionizing a target containing substances to be detected to obtain an ionized substance group containing ionized substances of the substances to be detected; a voltage application unit applying voltage to the ionized substance group to allow it to fly; and a separation unit allowing the ionized substance group to fly at a speed proportional to mass, and extracting the substances to be detected from the ionized substance group according to a time-of-flight based on the speed; a detector which includes: a plurality of detection units each including a field effect transistor having a graphene layer and a source electrode and a drain electrode connected to the graphene layer; and a plurality of organic probes provided on each of the graphene layers at the plurality of detection units, and at least some of which have different bond strengths with the substances to be detected, and in which the substances to be detected dropped from the separation unit are captured by the organic probes; and a discriminator to which detection signals generated when the substances to be detected are captured by the organic probes are transmitted from the field effect transistor of each of the plurality of detection units, and which discriminates the substance to be detected by a signal pattern based on an intensity difference of the detection signals generated by a difference in bond strengths between the plurality of organic probes and the substances to be detected.

Hereinafter, there will be explained a molecular detection apparatus and a molecular detection method according to embodiments with reference to the drawings. In the embodiments, substantially the same constituent elements are denoted by the same reference signs and a description thereof will be omitted in some case. The drawings are schematic, and a relation of the thickness and the planar dimension of each part, a thickness ratio among parts, and so on may differ from actual ones.

Figure 1:
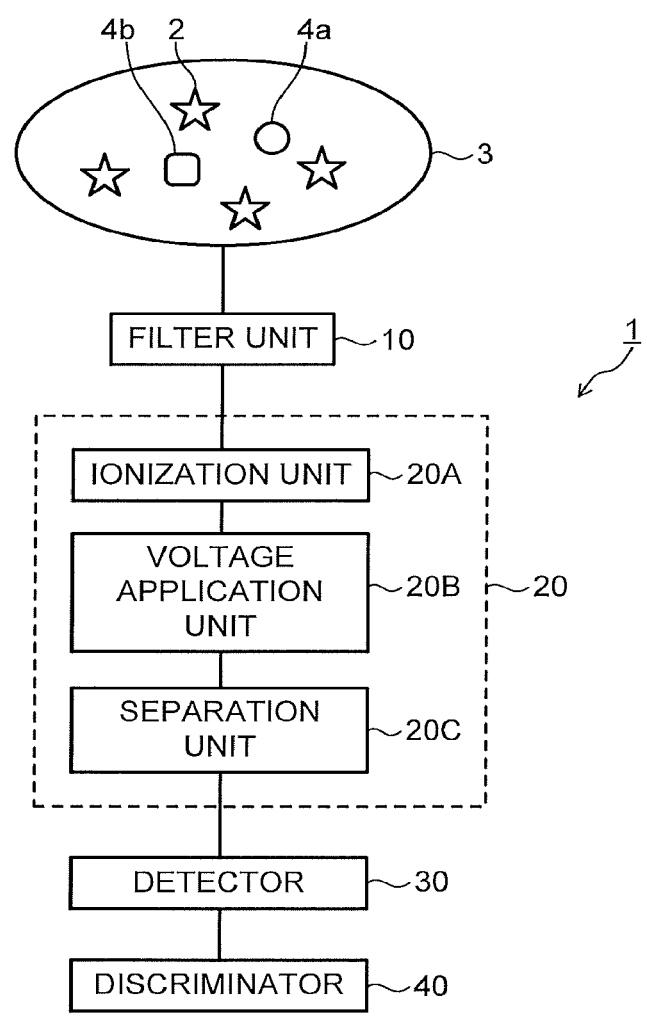
FIG. 1 is a block diagram illustrating a molecular detection apparatus according to an embodiment.
Figure 2:
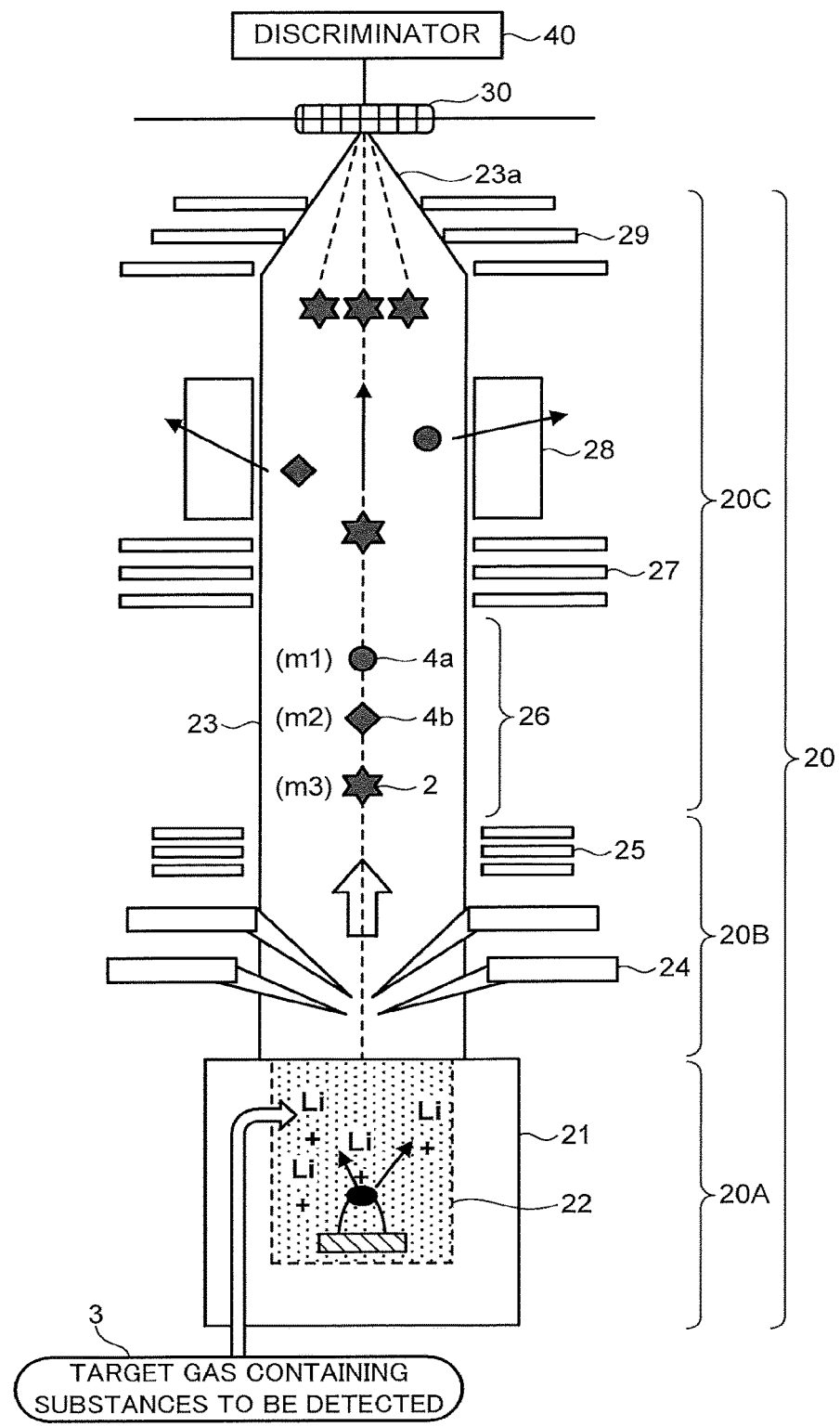
FIG. 2 is a configuration chart illustrating the molecular detection apparatus according to the embodiment.
Figure 3:
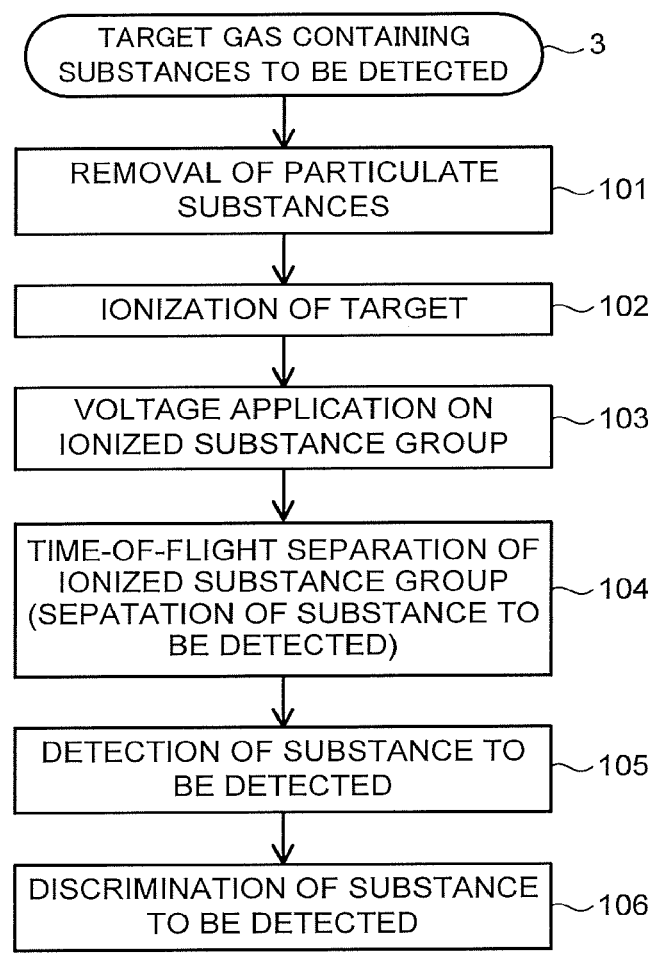
FIG. 3 is a view illustrating a molecular detection process according to the embodiment.

FIG. 1 is a block diagram illustrating a molecular detection apparatus according to the embodiment, FIG. 2 is a configuration chart illustrating the molecular detection apparatus according to the embodiment, and FIG. 3 is a view illustrating a molecular detection process according to the embodiment. A molecular detection apparatus 1 illustrated in FIG. 1 and FIG. 2 is an apparatus that detects substances to be detected 2, from a target (target gas) 3 containing the substances to be detected 2 generated from a gas generation source. For example, the substances to be detected 2 drifting in the air contain various foreign substances such as odor components and fine particles as impurities 4 (4a, 4b) in addition to oxygen, nitrogen, and so on in the air. Besides, the target (target gas) 3 sometimes contains, as impurities, substances having a molecular weight, a molecular structure or the like similar to those of the substance to be detected 2. The molecular detection apparatus 1 according to the embodiment is a simple apparatus which enables selective and higher sensitive detection of the substance to be detected 2 having an extremely low concentration in the order of, for example, ppb to ppt from the target 3 obtained from the air.

Hereinafter, a configuration of the molecular detection apparatus 1 according to the embodiment and a molecular detection process using the same are described in detail with reference to FIG. 1 to FIG. 9. The molecular detection apparatus 1 of the embodiment includes a filter unit 10, a distributor 20, a detector 30, and a discriminator 40. For example, the target (target gas) 3 containing the substances to be detected 2 obtained from the air is first sent to the filter unit 10. A generally-used moderate-to-high performance filter is used for the filter unit 10. The filter unit 10 removes particulate substances such as fine particles contained in the target 3 (FIG. 3 (101)). The target 3, from which the particulate substances are removed in the filter unit 10, is then sent to the distributor 20.

The distributor 20 includes an ionization unit 20A, a voltage application unit 20B, and a separation unit 20C. The target 3 that is sent to the distributor 20 is first ionized at the ionization unit 20A (FIG. 3 (102)). The ionization unit 20A includes an ion source 22 located in a vacuum container 21 whose pressure is reduced to vacuum. The ion source 22 generates ions such as lithium ions and sodium ions under vacuum. For example, an oxide is used for the ion source 22.

When lithium ions are generated, a mixture of a lithium oxide, an aluminum oxide, and a silicon oxide (mole ratio=1:1:1) or the like is used for the ion source 22. The ion source 22 is, for example, heated to approximately 250° C. under vacuum of approximately 100 Pa, and thereby, the lithium ions are released. It is also the same when sodium ions are used instead of the lithium ions.

At the ionization unit 20A, ions such as the lithium ions and the sodium ions generated from the ion source 22 attach to some molecules in the target 3, that is, molecules forming the substances to be detected 2 and the impurities 4. This action is called as an ion attachment. At the ionization unit 20A applying an ion attachment method, non-destructive and stable ionization of constituent molecules of the substances to be detected 2 is possible without generating cleavage (fragment) of target molecules. Hereinafter, substances which are ionized by the attachment of ions (the substances to be detected 2 and the impurities 4) are also called as ionized substances, and a substance group which is ionized is called as an ionized substance group.

The ionized substance group ionized at the ionization unit 20A is sent to the voltage application unit 20B. The voltage application unit 20B includes first ion lenses 24 and voltage application electrodes 25 provided inside a flight tube 23. The substance group (ionized substance group) which is ionized at the ionization unit 20A and acquires an electric charge is regulated in an ionic diameter thereof by passing through the first ion lenses 24, and further, voltage is applied by the voltage application electrodes 25. The first ion lenses 24 may function also as the voltage application electrodes 25. At the voltage application unit 20B, the ionized substance group, which is applied the voltage of, for example, approximately several kV and receives energy due to acceleration voltage, flies in the flight tube 23 (FIG. 3 (103)). The impurities such as water and nitrogen with low molecular weight do not fly in the flight tube 23 because the ion attachment is not effectively performed, and are removed under a reduced pressure.

The ion substance group which is applied the voltage at the voltage application unit 20B flies in the separation unit 20C of the flight tube 23. The separation unit 20C includes a flight space 26 which is set in the flight tube 23, second ion lenses 27, quadrupoles 28, and third ion lenses 29. At the separation unit 20C, the ionized substance group flies at a speed proportional to the mass thereof, and a substance with light mass flies quickly. An ionized substance of the substance to be detected 2 is separated from the ionized substance group by using a flight speed depending on the difference in mass and a time-of-flight based on the flight speed (time-of-flight separation) (FIG. 3 (104)). That is, the ionized substances of the impurities 4 are removed from the ionized substance group, and the ionized substances of the substances to be detected 2 are selectively arrived at the detector 30. As described later, the substances to be detected 2 may be arrived at the detector 30 under a state where some impurities 4 are mixed therein.

When the mass of the ionized substance is defined as m, and the time-of-flight is defined as t, a relationship defined in the following expression (1) is held between the mass m and the time-of-flight tin vacuum.

[expression 1]

$$t \propto \sqrt{m} \qquad (1)$$

In a process where the ionized substance group flies in the vacuum flight space 26, the flight distances are different depending on the molecular weights according to the expression (1). At the quadrupoles 28, substances other than a substance which conforms to an arbitrary voltage condition are discharged out of the pole according to a Mathieu equation.

In the above-described separation system, there is also a method to flow inert gas into the separation unit 20C such as a drift ion mobility method. In this method, since the ionized substance of the substance to be detected 2 proceeds in the inert gas while drifting, it is possible to set a length of the separation unit 20C short. A time-flight is the time-flight of drifting in the inert gas, but a drift time (t) is basically in a relation depending on a length (L) of the separation unit 20C, and they are in a relation illustrated in the following expression (2) by being described with a drift voltage (E).

[expression 2]

$$tE \propto L \qquad (2)$$

The larger a collision cross section of the ionized substance to be detected 2 is, the more collision with the inert gas increases, and the longer the time-of-flight becomes. The substances to be detected 2 and the impurities 4 are separated by using the collision cross section difference by each substance. When portability of the molecular detection apparatus 1 is considered to be important, a drift ion mobility method is suitable where the inert gas is flowed. Though separation ability deteriorates compared to the separation using the flight in vacuum, it is preferable to select the method performing the inert gas flow to make much account of the portability if a method selectively capturing the substance to be detected 2 after passing through the separation unit 20C is secured.

Time-of-flight separation ability is proportional to a flight distance of the ionized substance group, and therefore, the longer the length of the flight tube 23 is, the higher the separation ability becomes. On the other hand, as the flight tube 23 is made long, weight and volume thereof increase, and the portability of the molecular detection apparatus 1 is damaged. In the molecular detection apparatus 1 according to the embodiment, it is preferable to set the length of the flight tube 23 short to increase the portability. In this case, the separation ability of the separation unit 20C is a little lowered, and therefore, there is a possibility that the impurities 4 cannot be completely separated from the ionized substance group though they can be separated for some extent. The substances to be detected 2 may be arrived at the detector 30 in a state mixed with some impurities 4. It is possible to perform selective and highly sensitive detection by the later-described detector 30 and discriminator 40 even when the substances to be detected 2 are mixed with some impurities 4 as stated above.

It is preferable to provide einzel lenses near a terminal of the separation unit 20C (in the vicinity of a terminal end part 23a of the flight tube 23) as third ion lenses 29. The einzel lenses 29 each have a mechanism converging ion beams at an outside of the lens. Accordingly, it becomes possible to make the ionized substances of the substances to be detected 2 which are separated at the separation unit 20C arrive at a detection surface of the detector 30 under a converged state by providing the einzel lenses 29 in the vicinity of the terminal end part 23a of the flight tube 23. The einzel lens 29 is suitable as an interface from the ionized substance group of the distributor 20 to the ionized substance of the detector 30.

Figure 4:
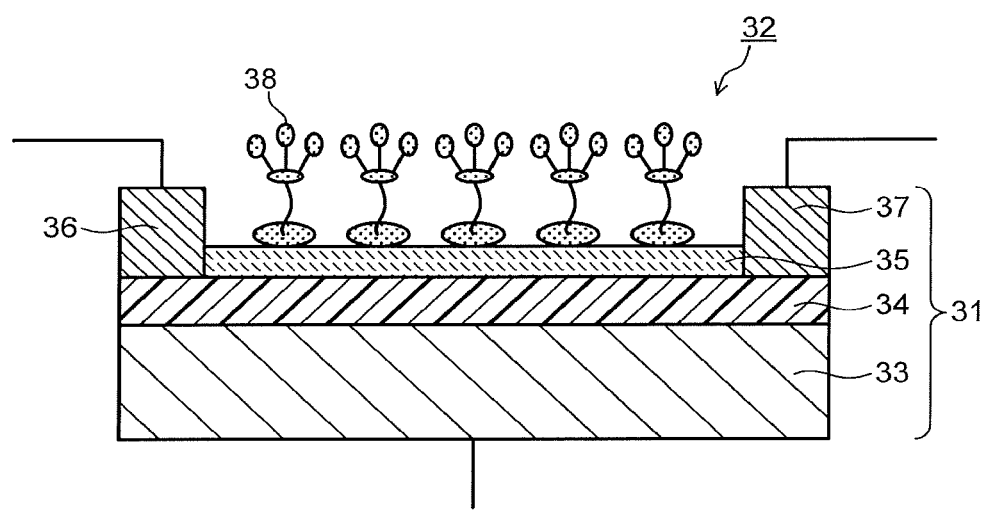
FIG. 4 is a sectional view illustrating a detection element used for the molecular detection apparatus according to the embodiment.

The ionized substances of the substances to be detected 2 separated by the distributor 20 are sent to the detector 30 to be detected (FIG. 3 (105)). Further, discrimination of the substances to be detected 2 is performed at the discriminator 40 based on a detection result (detection signal) by the detector 30 (FIG. 3 (106)). The detector 30 includes a detection element 32 using a graphene field effect transistor (GFET) 31 as illustrated in FIG. 4. The GFET 31 includes a semiconductor substrate 33 that functions as a gate electrode, an insulating film 34 provided as a gate insulating layer on the semiconductor substrate 33, a graphene layer 35 provided as a channel on the insulating film 34, a source electrode 36 provided at one end of the graphene layer 35, and a drain electrode 37 provided at the other end of the graphene layer 35.

The detection element 32 further includes organic probes 38 provided on the graphene layer 35 of the GFET 31. In FIG. 4, an example where the organic probes 38 are provided on the graphene layer 35 is illustrated, but the organic probes 38 may be provided on both surfaces of the graphene layer 35 when, for example, the graphene layer 35 is disposed in midair. Organic matters selectively bonding to the substances to be detected 2 are used for the organic probes 38. The substances to be detected 2 arrived at the detector 30 which includes the detection element 32 are captured by the organic probes 38 provided on the graphene layer 35. Some impurities 4 cannot obtain an interaction with the organic probes 38, and are not captured by the detection element 32. Electrons transfer from the substance (substance to be detected 2) captured by the organic probe 38 to the GFET 31, and thereby electrical detection is performed. In this way, the target substance to be detected 2 is selectively detected.

An organic matter forming the organic probe 38 has a property of dissolving in a solvent. Thus, the organic probe 38 can be installed at the graphene layer 35 by applying a solution obtained by dissolving the organic matter in a solvent to the graphene layer 35. In order to easily obtain an interaction with graphene, the organic probe 38 preferably has a portion having such a structure as a pyrene ring. A molecule having such a structure as the pyrene ring interacts with a hexagonally shaped $\pi$ electron system formed by carbon of the graphene, and forms an interaction state of what is called $\pi$-$\pi$ stacking. Low-concentration probe molecules are dissolved in a solvent and the resultant is applied to the graphene, and thereby the $\pi$-$\pi$ stacking is formed between the pyrene ring and the graphene and the probe molecules are aligned on the graphene to be fixed. By using such a self-alignment action, the organic probe 38 can be installed on the graphene layer 35.

When the substances to be detected 2 are captured by the organic probes 38 provided on the graphene layer 35, an output from the GFET 31 changes. The case of a single layer of graphene means that there is zero gap, and thus, the source electrode 36 and the drain electrode 37 are continuously electrified normally. When the number of graphene layers increases to two or three layers, a band gap is generated, but such a band gap in an actual system is relatively smaller than that considered from a strict theoretical value. When the gate insulating layer 34 has a dielectric constant approximately similar to that of a silicon oxide film, the source electrode 36 and the drain electrode 37 are often continuously electrified. Thus, the graphene layer 35 may be formed of a stack composed of about five graphene layers or less as well as the single layer structure of graphene.

Capturing of the substance to be detected 2 by the organic probe 38 disturbs the flow of electricity between the source electrode 36 and the drain electrode 37, and thus the GFET 31 functions as a sensor. With the GFET 31 using the graphene layer 35 as a channel, even an extremely slight electrical change appears significantly as an output. As a result, it is possible to constitute the highly sensitive detection element 32. The sensor using the GFET 31 also has a tendency that electric current flows between the source electrode 36 and the drain electrode 37 without application of voltage to the gate electrode 33 because the graphene has a property as a zero-gap semiconductor. Thus, the GFET 31 functions as a sensor as it is. However, normally, the GFET 31 applies electric current between the source electrode 36 and the drain electrode 37 in a state of applying voltage to the gate electrode 33, and observes an electrical change of the gate electrode 33 when the organic probe 38 captures the substance to be detected 2.

In the detection of the substance to be detected 2 performed by the above-described detection element 32, as the transfer of electrons from the substance (substance to be detected 2) that is captured by the organic probe 38 to the GFET 31 is higher, the function as the sensor is further increased. The sensor using the GFET 31 is regarded as the most sensitive FET sensor, and can improve sensitivity about three times as compared to a sensor using a carbon nanotube. Thus, using the detection element 32 in which the GFET 31 and the organic probes 38 are combined enables higher sensitive detection of the substance to be detected 2.

It is possible for the detector 30 equipped with the detection element 32 using the GFET 31 to efficiently capture the substance to be detected 2 and to obtain the detection signal by providing the detection surface at an output port of the time-of-flight separation unit 20C in a surface state. The graphene layer 35 forming the detector 30 is preferably processed into a round shape or an elliptical shape being a similar shape in accordance with a terminal shape of the separation unit 20C. When the carbon nanotube is used as a sensor, an effective portion to collide with the substance to be detected is limited. On the other hand, graphene has flatness, and therefore, it can be easily patterned by a conventional semiconductor processing method. Thus, high-sensitive detection element 32 can be enabled.

As stated above, it is possible to provide the molecular detection apparatus 1 whose detection sensitivity is improved by using the detection element 32 in which the GFET 31 and the organic probes 38 are combined in addition that the portability is increased by shortening the length of the flight tube 23 (time-of-flight separation unit 20C). Further, the molecular detection apparatus 1 according to the embodiment is constituted such that the detection surface of the detector 30 is sectioned into a plurality of detection elements (detection cells), and the substance to be detected 2 is detected and discriminated based on detection results (detection signals) from these plurality of detection elements (detection cells) so as to enhance detection accuracy of the substance to be detected 2.

Figure 5:
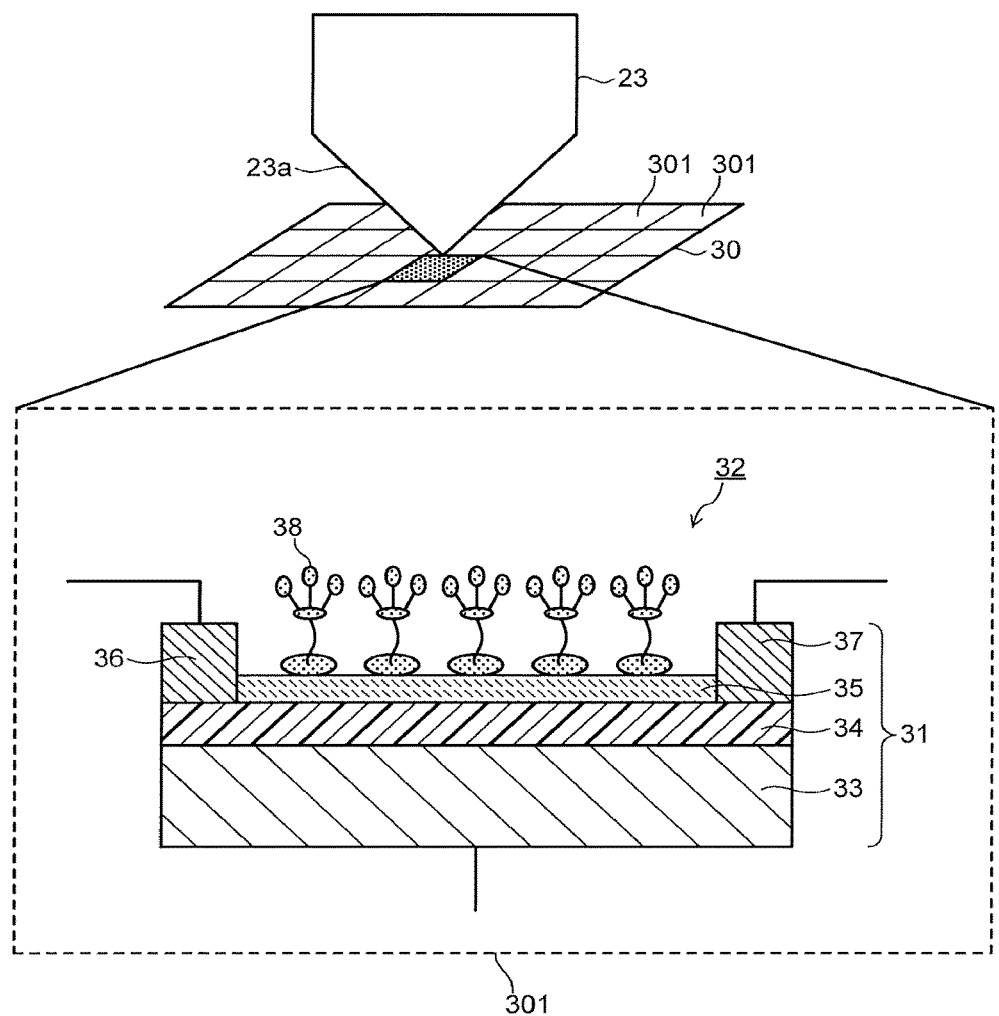
FIG. 5 is a view illustrating a configuration of a detector in the molecular detection apparatus according to the embodiment.

The detector 30 in the molecular detection apparatus 1 according to the embodiment has the detection surface sectioned into a plurality of detection elements (detection cells) 301 as illustrated in FIG. 5. Each of the plurality of detection elements (detection cells) 301 has the detection element 32 in which the GFET 31 and the organic probes 38 are combined. FIG. 5 illustrates the detection surface on which the plurality of detection elements (detection cells) 301 are arranged in a grid pattern (an array pattern), but is not necessarily limited thereto. The plurality of detection elements (detection cells) 301 may be arranged linearly. At least some of the organic probes 38 provided at the graphene layers 35 of the plurality of detection elements 301 are different in bond strength with the substance to be detected 2. That is, the plurality of detection elements 301 include a plurality of the organic probes 38 different in the bond strength with the substance to be detected 2. All the organic probes 38 may be different in the bond strength with the substance to be detected 2, or some of the organic probes 38 may be different in the bond strength with the substance to be detected 2.

Figure 6A:
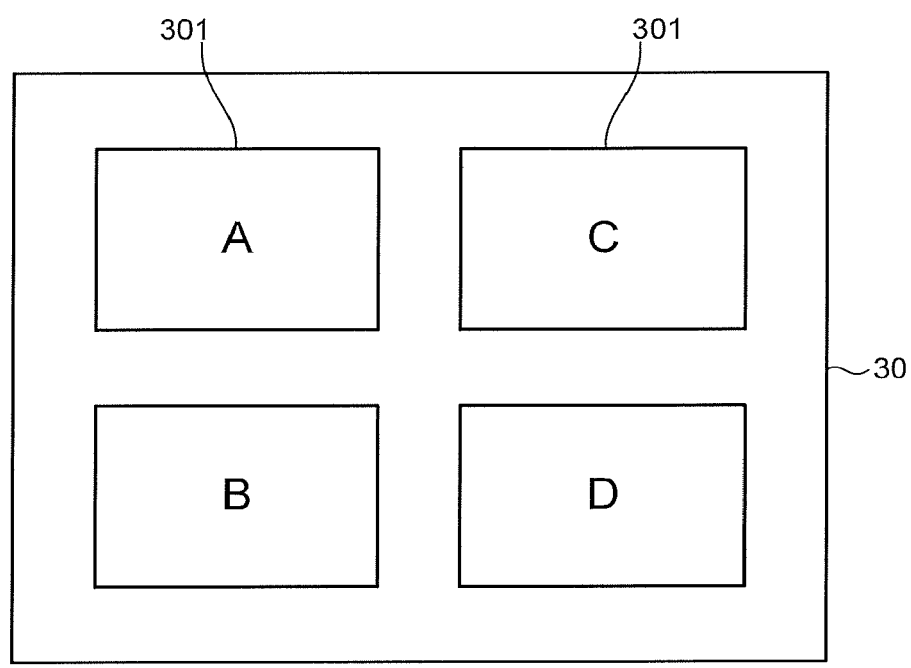
FIG. 6A is a view illustrating an example of detection cells in the molecular detection apparatus according to the embodiment.
Figure 6B:
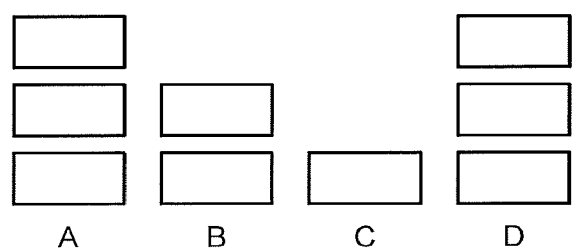
FIG. 6B is a view illustrating an example of a detection result of substances to be detected by the detection cells illustrated in FIG. 6A.

FIG. 6A illustrates a grid-shaped sensor in which the detection surface of the detector 30 is sectioned into four detection elements 301, that is a detection cell A, a detection cell B, a detection cell C, and a detection cell D. At least in some of the detection cells A to D, different types of the organic probes 38, that is the plurality of organic probes 38 different in the bond strength with the substance to be detected 2, are provided. The plurality of organic probes 38 each have an interaction with the substance to be detected 2, but are different in working strength (bond strength) with the substance to be detected 2, and thus detection signals are different in intensity. FIG. 6B illustrates detection signals of the detection cells A to D. The detection signals from the detection cells A to D are respectively different in signal intensity due to the bond strength of the organic probe 38 with the substance to be detected 2.

The detection signals having different intensities output from the detection cells A to D are sent to the discriminator 40 to be signal-processed. The discriminator 40 converts each of the detection signals from the detection cells A to D into intensity and analyzes a signal pattern based on intensity differences of these detection signals (for example, pattern of four detection signals illustrated in FIG. 6B). The discriminator 40 stores therein signal pattern according to a substance to be detected and compares the signal pattern with the signal pattern detected in the detection cells A to D, to thereby discriminate the substance to be detected 2 detected in the detector 30. Such a signal process is called a pattern recognition method here. The pattern recognition method enables detection and discrimination of the substance to be detected 2 by signal pattern peculiar to the substance to be detected like a dactyloscopy, for example. Accordingly, selective and higher sensitive detection of a gas component (substance to be detected 2) having an extremely low concentration in the order of ppt to ppb is enabled. It is possible to further improve the detection accuracy of the substance to be detected 2 according to the pattern recognition method by increasing the number of detection cells, or installing the plurality of organic probes 38 in one detection cell to obtain peculiar signal intensity.

Application of the above-described pattern recognition method enables selective and higher sensitive detection and discrimination of the substance to be detected 2 even when the length of the flight tube 23 (time-of-flight separation unit 20C) is shortened to increase the portability, but then a mixing ratio of the impurities 4 arriving at the detector 30 increases. For example, when the substance to be detected 2 is dimethyl methylphosphonate (DMMP, molecular weight: 124), which is a typical material for a toxic organophosphorus compound, there exist agricultural chemicals containing phosphoric acid such as dichlorvos having a similar chemical structure and organophosphorus pesticides, which are used often, such as malathion, chlorpyrifos, and diazinon. In order to prevent an erroneous detection of these substances, discrimination by such signal patterns as illustrated in FIG. 6B is effective.

It is preferable to make a tip of the flight tube 23 (time-of-flight separation unit 20C) protrude toward the detector 30 and to dispose the plurality of detection units 301 to face the protruded tip to detect the substances to be detected 2 by the plurality of detection units (detection cells) 301 of the detector 30. The substances to be detected 2 are effectively dropped on the plurality of detection units 301 to thereby enable the efficient detection of the substances to be detected 2 by the plurality of detection units 301. Further, it is effective to converge the substances to be detected 2 on the detector 30 by using the einzel lenses 29 provided at the terminal end part 23a of the flight tube 23 when the substances to be detected 2 are detected by the plurality of detection units 301.

Figure 7:
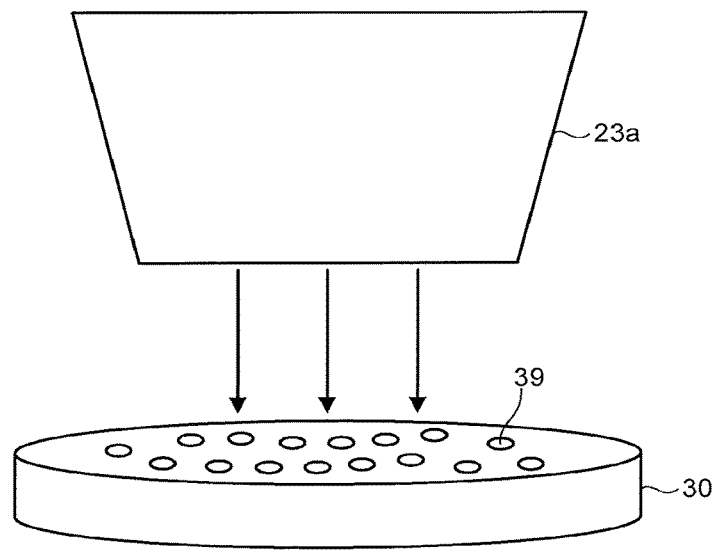
FIG. 7 is a perspective view illustrating the detector in the molecular detection apparatus according to the embodiment.

The detector 30 preferably has through holes 39 provided along a dropping direction (flight direction) of the substances to be detected 2 as illustrated in FIG. 7. Among ions of the substances to be detected 2 dropped from the separation unit 20C, ions of the substances to be detected 2 and ions of the impurities 4 which collide with the detection surface but are not captured, and ions which collide with a margin part of the detection surface and are not captured, and so on disturb the detection of the substances to be detected 2. An ion group disturbing the detection is discharged from the detection surface by passing through the through holes 39. Accordingly, the detection accuracy of the substance to be detected 2 can be enhanced. When the through holes 39 are not provided, ions move to diffuse along the detection surface, and therefore, there is a possibility of causing erroneous detection.

Figure 8:
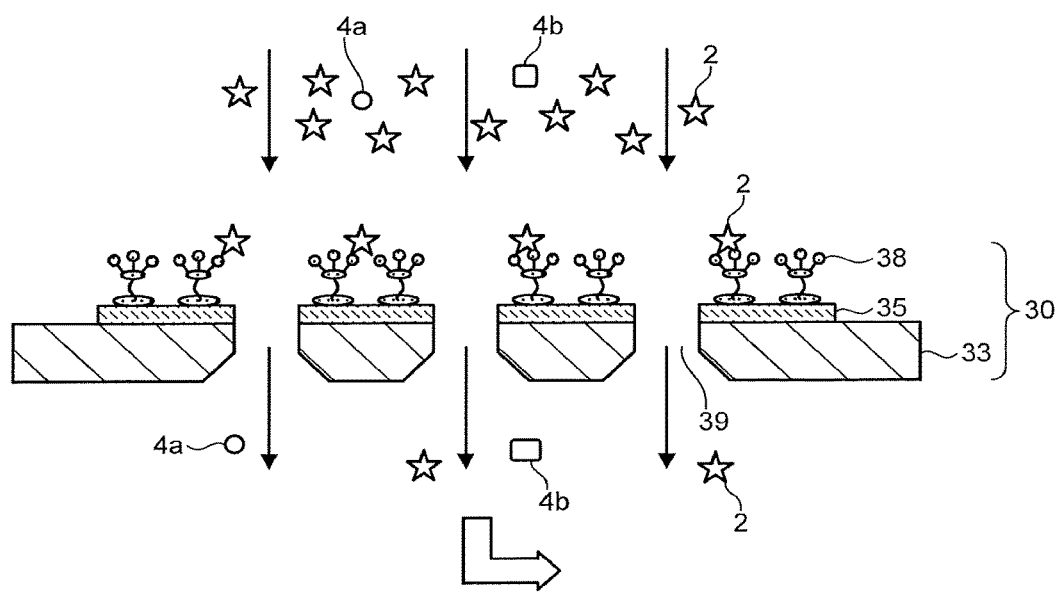
FIG. 8 is a sectional view illustrating the detector in the molecular detection apparatus according to the embodiment.

As illustrated in FIG. 8, when a substrate 33 forming the detector 30 (detection element 32) is silicon, the through holes 39 can be easily formed by resist patterning. For example, a photo resist or an oxide film with a thickness of 3 to 5 µm is used as a pattern, and etching is performed with $CF_4$ and $CHF_3$ being fluorine-based gas under a condition at approximately 100 Wrf, 100 sccm, 5.3 Pa. Otherwise, the etching is performed with $SF_6$ under a condition at 800 Wfr, 130 sccm, 4 Pa, and thereafter, it is protected with $C_4F_8$ gas. When a reactive ion etching method as stated above is applied, it takes several minutes to several hours to form a groove of approximately several dozen µm depending on the thickness of the substrate, and therefore, a groove is roughly formed from a reverse surface of a sensor installation surface beforehand, and then the reactive ion etching with high directivity may be performed from a sensor installed surface side. As a result, shapes of the grooves 39 each become a trapezoid as illustrated in FIG. 8. In particular, when necessity to miniaturize the through holes 39 is low or when the substances to be detected 2 are to be passed more efficiently, the through holes 39 may be formed with a millimeter diameter carbide drill.

Figure 9:
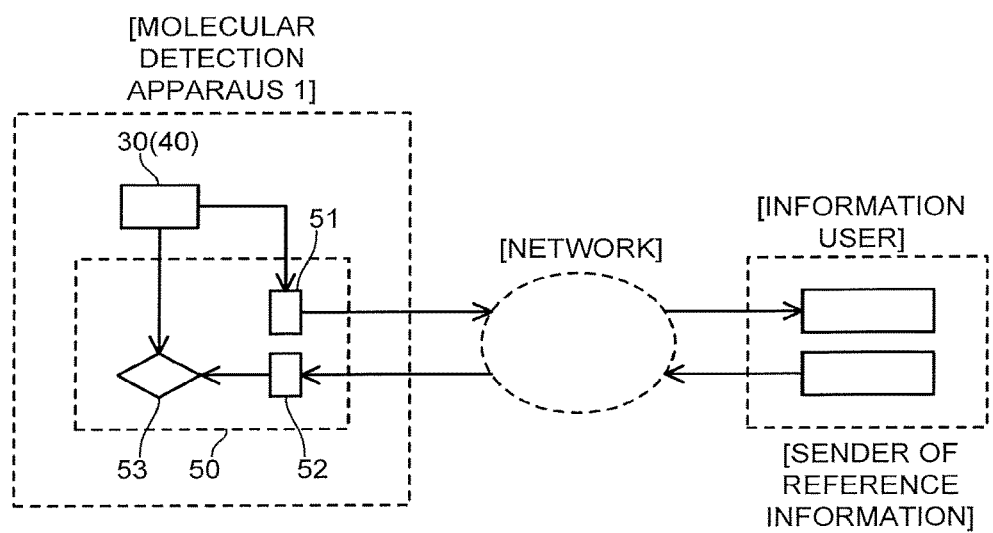
FIG. 9 is a view illustrating an information processing unit in the molecular detection apparatus according to the embodiment.

Detection and discrimination results of the substance to be detected 2 obtained by the molecular detection apparatus 1 may be transmitted over information network to be utilized. FIG. 9 illustrates the molecular detection apparatus 1 with an information processing unit 50 attached thereto or provided internally, the information processing unit 50 including a function of transmitting detection information of the substance to be detected 2 over the information network and a function of checking the detection information and reference information obtained from the information network. The information processing unit 50 includes an information transmitting unit 51 transmitting the detection information of the substance to be detected 2, an information receiving unit 52 receiving the reference information, and an information checking unit 53 checking the detection information and the reference information. The information processing unit 50 may have only one of the information transmitting function, and the information checking function.

The information transmitting unit 51 transmits the detection information of the substance to be detected 2 to an information user over network. In order to check the detection information of the substance to be detected 2 with the existing reference information, the information receiving unit 52 obtains the reference information over the network. The information checking unit 53 checks the obtained reference information with the detection information. Information is obtained from an external network to be referred to, and thereby a function of carrying a lot of information and analyzing them can be replaced with an alternative externally. Consequently, further miniaturization of the molecular detection apparatus 1 is enabled to increase portability. Further, using a network transmission means also makes it possible to obtain new signal patterns by the pattern recognition method immediately. On the information receiving side, it is possible to make a next action based on this information. It is possible to use the molecular detection apparatus 1 in such a way that the portable molecular detection apparatus 1 is disposed at respective places and data to be obtained are collected from the respective places to be analyzed, and then the analyzed data are utilized for evacuation guidance under abnormal circumstances or the like. The network and the molecular detection apparatus 1 are combined, and thereby a lot of use ways, which were not able to be achieved conventionally, are created and its industrial value improves.

According to the molecular detection apparatus 1 according to the embodiment, the selective and higher sensitive detection of the gas component having the extremely low concentration in the order of ppt to ppb is possible. Further, it is possible to miniaturize the molecular detection apparatus 1 by enhancing the detection sensitivity and the detection accuracy by the detector 30 and the discriminator 40. Accordingly, it becomes possible to provide the molecular detection apparatus 1 where the portability and the detection accuracy are both enabled. It is possible for the molecular detection apparatus 1 according to the embodiment to effectively exert the functions at various sites such as at a disaster site or a site at which an act of terrorism occurs or the like.

For example, the toxic gas used in the sarin nerve-gas attack on the Tokyo subway system occurred in the 90s had effect of the ppt concentration on a human body. Though we recognize the fact as stated above, we are still exposed to a situation where it is difficult to detect the toxic gas or the like in real time, and to secure the time to take refuge. Besides, as another example, there can be cited a case to search victims who are buried arrive due to large-scaled landslide disaster, earthquake, and so on. It is difficult to search the buried victims, so we are recommended to always carry a whistle. However, actually, victims often cannot get help because they lose consciousness, or the like. There is a case when trained search and rescue dogs are used, but it is not easy to rapidly secure the sufficient number of rescue dogs. Accordingly, a technology capable of searching the victims based on a slight odor component brings a good news to a lot of damaged sites. Further, illegal drug smuggling becomes a serious problem as the world is globalized and a lot of people come and go. There is a limit in countermeasure relying on intuition of inspectors, and tons of illegal drugs have been carried in. The detection and analysis of the extremely low concentration gas component are largely expected as a means to detect the illegal drug as stated above.

Besides, it is desired to prevent a case when organophosphorus pesticide is carried in a food manufacturing site or the like to be intentionally mixed into foods. Similarly, rapid sensing of toxic gas that has an extremely strong effect on a human body has been required as seen in the sarin nerve-gas attack on the Tokyo subway system. It is also important to prevent secondary damage when a type of gas is searched and identified. It is commonly demanded to detect a very few amount of gas component having an extremely low concentration in real time. In the case of agricultural chemicals carried in a food processing site, it is desired to be able to detect a component which is emitted when a lid of the agricultural chemicals is opened, and in the case of spreading toxic gas, it is desired to secure a sufficient time to take refuge after the detection. In any case, the detection at the extremely low concentration in the order of ppt to ppb is required, and a hand-carry size capable of carrying the detection apparatus into the site is desired. It is demanded to simultaneously satisfy the requirement to be the hand-carryable detection apparatus which is light in weight and small in volume and the requirement to be the detection apparatus capable of detecting the extremely low concentration in the order of ppt to ppb. The molecular detection apparatus 1 according to the embodiment simultaneously satisfy these requirements.

Further, in recent years, development of robot technology is remarkable in addition to drone and artificial intelligence, and perspectives on "Umwelt" have been focused in terms of ethics and philosophy. Umwelt is a concept proposed by the philosopher Uexküll, and it means each way of feeling regarding time and space held by animals, and examples of, for example, fleas and bees have been introduced. It is considered that humans are excellent in ability of moving between Umwelten, but sense organs such as a sense-of-sight and a sense-of-smell cannot be changed, and therefore, certain restriction is applied to Umwelt. Extension of Umwelt regarding the sense-of-sight has been emphasized up to now, and there has been developed various kinds of video equipment such as a thin display, a 2K-4K display, a CMOS digital camera, and a monitoring camera. As stated above, humans have invented various equipment for daily use, to thereby extend Umwelt. In particular, the extension of Umwelt regarding the sense-of-smell is began to be attempted in recent years.

The human sense-of-smell senses an odor at approximately 5 ppm, for example, in case of ammonia generated from metabolite such as urine, and feels uncomfortable at approximately 30 ppm according to an AGEL 30-minute standard presented by Division of safety information of National institute of health sciences. On the other hand, in the case of hydrogen sulfide contained in volcanic gas, it is felt uncomfortable at approximately 0.6 ppm according to the AGEL 30-minute standard. There is a large difference in the uncomfortable feelings sensed by humans depending on substances, and therefore, Umwelt generated by the smell felt by humans has been restricted. Accordingly, there is a possibility of further improvement in humans' standard of living, and it may largely contribute to life saving at a disaster site and development of nursing robot technology by removing the restriction in the way of smell sensing depending on substances, and enabling a world of hyper-sense-of-smell, which extend Umwelt of humans. From such a viewpoint, it is demanded to enable both the portability and the detection of the extremely low concentration gas component. The molecular detection apparatus 1 according to the embodiment satisfies such a demand.

EXAMPLE

In examples, dimethyl methylphosphonate (DMMP, molecular weight: 124) which is a toxic organophosphorus material, is used as a substance to be detected. DMMP being the substance to be detected is liquid at room temperature, has a flash point of 69° C., and a boiling point of 181° C. A vapor pressure is 79 Pa (at 20° C.). It has a property stable in liquid state at room temperature. In order to vaporize such liquid, it is general to increase a temperature to accelerate vaporization. Though, there are adopted a method aerating inert gas in the liquid to increase a surface area of the liquid, what is called bubbling, a method accelerating vaporization by spraying gas on a liquid surface, and so on as a more simple method.

A concentration of the gas obtained as stated above is approximately from ppm (parts per million) to ppb (parts per billion), and the concentration is lowered by mixing the gas with the inert gas. The concentration of DMMP contained in the aerated nitrogen ($N_2$) gas by using the bubbling in the example is set to 10 ppm. The DMMP concentration is lowered by mixing second nitrogen gas with the gas. A gas concentration adjusting system is set such that the concentration can be arbitrary adjusted to be 100 ppt (parts per trillion) or more. The DMMP gas whose concentration is adjusted is passed throughout a filter to remove particles, and then introduced into the molecular detection apparatus. At this time, some molecules are mixed therein as foreign substances.

On the other hand, a detection element in which a GFET and an organic probe are combined is prepared as follows. A graphene layer is formed by transferring graphite onto a substrate by an exfoliation method or by depositing graphene on a metal surface by means of a chemical vapor deposition method (CVD). A single layer or a plurality of layers of graphenes deposited on the metal surface are transferred onto a polymer film, and the resultant polymer film is transferred again onto a desired semiconductor substrate for field effect transistor (FET) fabrication. For example, graphene is formed on a surface of a copper foil by CVD with flowing of methane gas under a condition of approximately 1000° C.

Next, a polymethyl methacrylate film is applied at 4000 rpm by a spin coating method, and an opposite surface of the copper foil film is etched with an ammonium persulfate 0.1 M solution, and thereby, the graphene film is transferred onto the polymethyl methacrylate film side. A surface of the graphene film is sufficiently cleaned, and then this is transferred onto a silicon substrate again. The redundant polymethyl methacrylate film is dissolved with acetone to be removed. A resist is applied onto the graphene transferred onto the silicon substrate to undergo patterning, and a pattern with a 10 μm electrode interval is formed by oxygen plasma. Electrodes are deposited to form an FET structure on which a source electrode and a drain electrode are provided. The graphene is disposed on an oxide film formed on the surface of the silicon substrate and an FET type sensor structure is formed in which the graphene is sandwiched between the source electrode and the drain electrode and the silicon substrate side is set as the gate electrode.

The graphene sensor has a tendency that electric current flows between the source and the drain without application of voltage to the gate electrode because the graphene has a property as a zero-gap semiconductor. Thus, it functions as a sensor as it is, and a detection signal can be obtained by collision of substances with the graphene. However, normally, electric current is applied between the source and the drain in a state of applying the gate voltage, and an electrical change of the gate electrode is observed when the substances are in contact.

Next, organic probes are provided on the surface of the graphene. The organic probe is installed in a manner that an organic compound is dissolved in a methanol solution with a concentration of 10 nM and a graphene sensor surface is immersed in the resultant solution for several minutes. Installation of the organic probes enables the selective capturing of the substances to be detected. Even when impurities are mixed resulting from the rough separation at the separation unit, the desired substance to be detected can be selectively detected by the organic probe. It is desirable that the pyrene ring is provided at the organic probe. Interaction is generated with graphene, and the organic probe is stably installed on the graphene surface. Besides, metal phthalocyanine is also effective for interaction with graphene.

Figure 10:
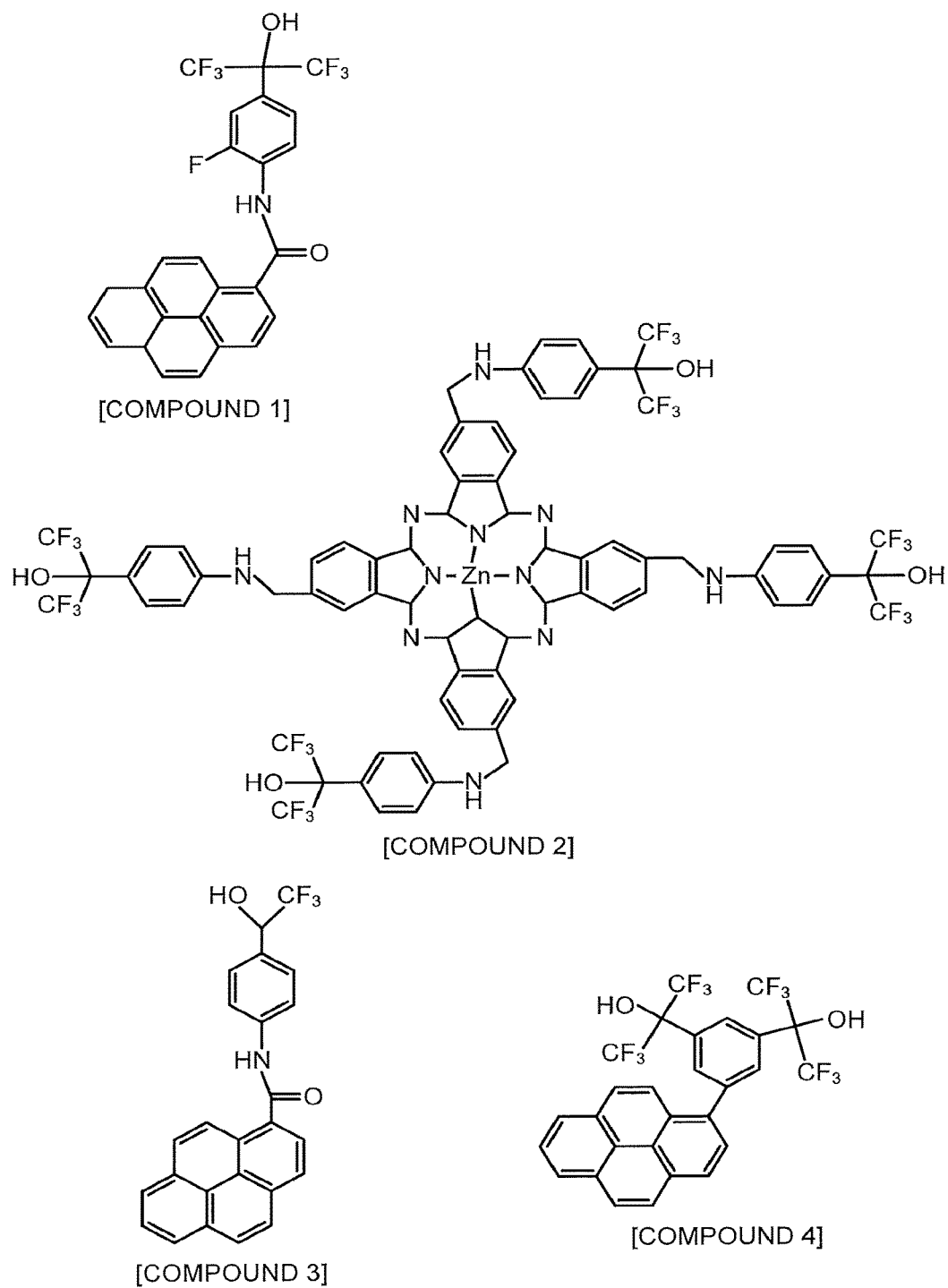
FIG. 10 is a view illustrating examples of organic compounds used for organic probes in the detector of the molecular detection apparatus according to the embodiment.
Figure 11:
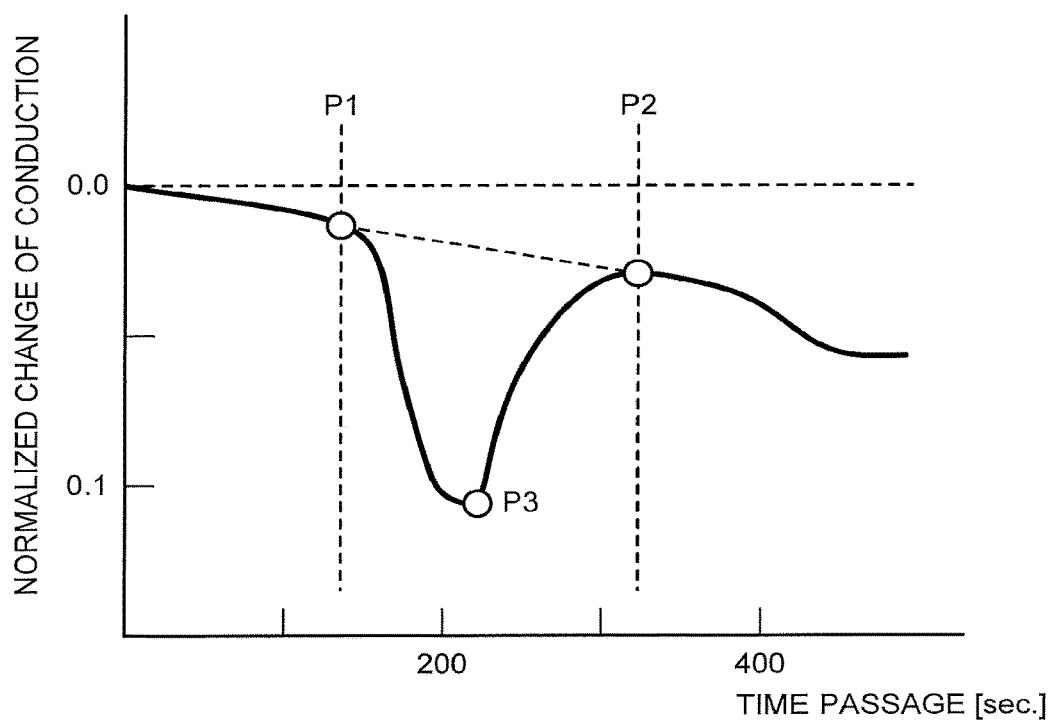
FIG. 11 is a view illustrating an example of a detected waveform of the substance to be detected by a molecular detection apparatus according to an example.

As another characteristic of the organic probe, there can be cited fluorination and existence of a hydroxyl group. FIG. 10 illustrates compound examples forming the organic probes. As illustrated in FIG. 10, there exists a fluorinated propanol structure (hexafluoropropanol structure) or a fluorinated ethanol structure (trifluoroethanol structure) at a tip of the organic probe. These structures have an effect of enhancing activity of the hydroxyl group with fluorine having high electronegativity. The hydroxyl group affects the organophosphorus material being the substance to be detected, and selectively captures the organophosphorus material. In an example detecting DMMP at the concentration of 400 ppt by using the organic probe formed by a compound 1 in FIG. 10, a change of the gate electrode in a vertical axis can be seen as time passes in a horizontal axis as illustrated in FIG. 11.

Many of the organophosphorus materials captured by the organic probes are released after the passage of time, but a part thereof is fixed. After a few times of sensing, it becomes necessary to release the organophosphorus materials being the fixed substances to be detected. Gas where 3% of hydrogen at the explosion limit or less is mixed with argon is filled in a firing furnace to be heated, and the substances to be detected which are fixed to the organic probe surface of the sensor are released. This operation is called as reactivation (refresh). It is desired to apply a temperature at approximately 200 to 400° C. for 20 to 30 minutes for the refresh. It is appropriately set in consideration of kinds and disposition states of the organic probes.

The detection of the DMMP gas is performed as described below by using the above-stated sample gas containing DMMP and the detection element. The molecular detection apparatus is in a low-vacuum state of approximately 100 Pa, and an ion source is located therein. The ion source is formed of oxide, and lithium ions or sodium ions are released by being heated to approximately 250° C. These ions non-destructively attach to substances (ion attachment). The ion attachment does not occur in low molecules such as water. Probability of ion attachment is relatively low when hexane molecular weight is about 86 or less. According to the ion attachment method, it is possible to send the molecules to be detected to the separation unit as it is because cleavage (fragment) of a target molecule does not occur.

The gas containing the ionized substance to be detected (DMMP) and foreign substances is applied voltage to fly in the flight tube, further, the foreign substances are removed at the separation unit. The ionized substance to be detected (DMMP) is dropped onto the detector to be detected. The detection of the substance to be detected (DMMP) by the detector is performed according to the above-described pattern recognition method. In order to apply the pattern recognition method, the organic probes each having different bond strength with the substance to be detected (DMMP) are installed on the plurality of detection units. The pattern recognition method is effective because there is a case when the organic probe sometimes captures a substance having a chemical structure or the like extremely resembling to the substance to be detected. For example, in the case of the detection of DMMP, there is a substance whose molecular weight is 141 to be very close to DMMP in some agricultural chemicals containing phosphoric acid such as methamidphos, where the molecular weight of DMMP is 124, and the substance is sometimes mixed as impurities when the separation at the separation unit is insufficient.

Figure 12A:
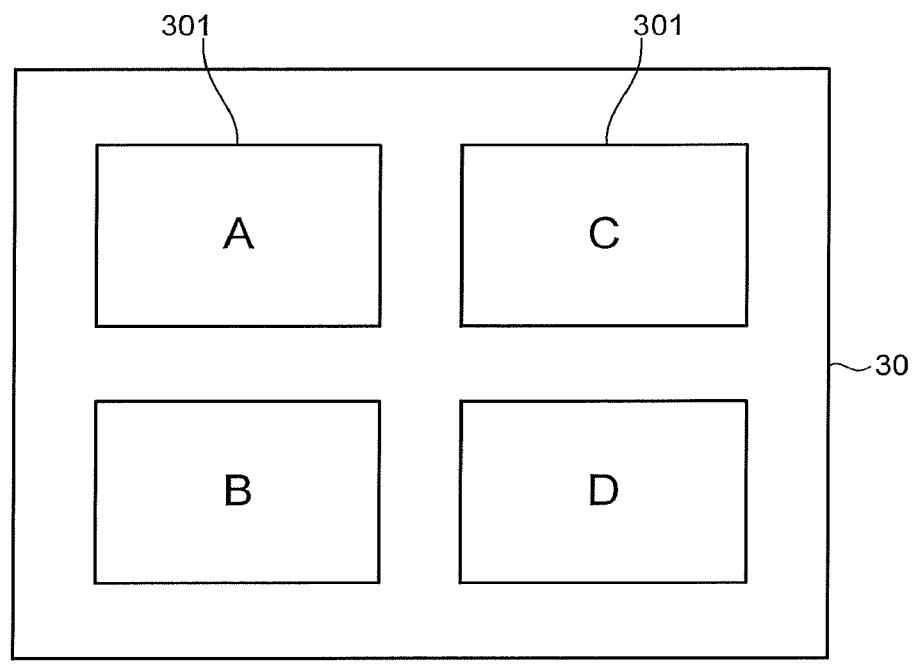
FIG. 12A is a view illustrating an example of detection cells of the molecular detection apparatus according to the example.
Figure 12B:
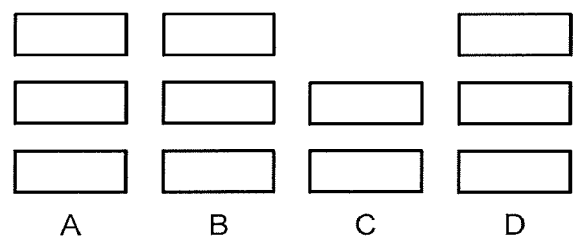
FIG. 12B is a view illustrating a first example of a detection result of the substances to be detected by the detection cells illustrated in FIG. 12A.
Figure 12C:
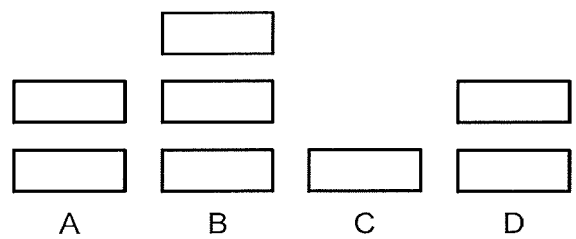
FIG. 12C is a view illustrating a second example of a detection result of the substances to be detected by the detection cells illustrated in FIG. 12A.

As described above, a possibility that the impurities are mixed becomes high if a size of the separation unit is reduced to enable portability. There exist agricultural chemicals containing phosphoric acid such as dichlorvos having a similar chemical structure and organophosphorus pesticides, which are used often, such as malathion, chlorpyrifos, and diazinon. In order to prevent an erroneous detection of these substances, discrimination by the pattern recognition method as illustrated in FIG. 12A to FIG. 12C is effective. As illustrated in FIG. 12A, four cells are provided on the detection surface, and the organic probes different from one another are installed on each of them. The structural examples of the organic probes are as illustrated in FIG. 10. The substances to be detected led out of the separation unit are detected at each cell. Since the organic probes are respectively different in the bond strength with the substance to be detected, signals to be detected by the gate electrodes are also different respectively.

Results of detection by the respective cells are sent to the discriminator that processes signals, and are each converted into intensity. Although a method of converting into intensity can be variously considered, a value calculated from an area defined by P1, P2 and P3 being a tip of a peak in FIG. 11 is set as the intensity. However, the conversion is not necessarily limited to this method. As illustrated in FIG. 12B and FIG. 12C, recognition results are each output as a relative intensity display. FIG. 12B illustrates a result where measurement is performed while setting DMMP as the substance to be detected, and FIG. 12C illustrates a result where measurement is performed while setting diphenyl chlorophosphate (dPCP) as the substance to be detected. In the pattern recognition method, the intensities which are different by respective cells are collectively analyzed to obtain signal intensity patterns peculiar to respective substances to be detected. The substance to be detected is discriminated based on the signal pattern, and thereby, it is possible to selectively and high-sensitively detect the substance to be detected (gas component) having an extremely low concentration in the order of ppt to ppb. The signal intensity patterns of the substances to be detected may be stored in advance, or may be received through information network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The inventions described in the accompanying claims and their equivalents are intended to cover such forms or modifications as would fall within the scope and spirit of the inventions.

What is claimed is:

1. A molecular detection apparatus, comprising:
a distributor which includes: an ionization unit ionizing a target containing substances to be detected to obtain an ionized substance group containing ionized substances of the substances to be detected; a voltage application unit including a first electrode configured to apply voltage to the ionized substance group to allow the ionized substance group to fly; and a separation unit including a flight space in which the ionized substance group flies at a speed proportional to mass, and a quadrupole configured to discharge other substances except the substances to be detected, the separation unit configured to extract the substances to be detected from the ionized substance group; and
a detector which includes: a plurality of detection units; and a plurality of organic probes provided at each of the plurality of detection units, at least part of the plurality of organic probes having different bond strengths with the substances to be detected, and the substances to be detected dropped from the separation unit being captured by the plurality of organic probes.

2. The molecular detection apparatus according to claim 1,
wherein the plurality of detection units are arranged in a grid pattern.

3. The molecular detection apparatus according to claim 1,
wherein the detector includes through holes provided along a dropping direction of the substances to be detected.

4. The molecular detection apparatus according to claim 1,
wherein the distributor includes a tip protruded toward the detector, and the plurality of detection units of the detector are arranged to face the protruded tip.

5. The molecular detection apparatus according to claim 1,
wherein the ionization unit ionizes the target by attaching at least one ion selected from the ionized substance group consisting of a lithium ion and a sodium ion to the target containing the substances to be detected.

6. The molecular detection apparatus according to claim wherein the substances to be detected is a compound containing phosphorus.

7. The molecular detection apparatus according to claim 1, further comprising:
an information processing unit which includes at least one function selected from a function of transmitting detection information of the substances to be detected over an information network and a function of checking the detection information with reference information obtained from the information network.

8. The molecular detection apparatus according to claim 1, further comprising:
a discriminator to which detection signals generated by the substances to be detected being captured by the organic probes in the plurality of detection units are transmitted from a field effect transistor of each of the plurality of detection units, and which discriminates the substances to be detected by a detection signal pattern constituted by the detection signals having different intensities generated by a difference in bond strengths between the plurality of organic probes and the substances to be detected.

9. The molecular detection apparatus according to claim 1,
wherein each of the plurality of detection units includes a graphene layer and an electrode connected to the graphene layer, and the plurality of organic probes are provided on each of the graphene layers.

10. The molecular detection apparatus according to claim 1,
wherein each of the plurality of detection units includes a field effect transistor having a graphene layer and a source electrode and a drain electrode connected to the graphene layer, and the plurality of organic probes are provided on each of the graphene layers.

* * * * *